United States Patent [19]

Gallet et al.

[11] 4,016,035

[45] Apr. 5, 1977

[54] FUEL ASSEMBLY SUPPORT COLUMN FOR A NUCLEAR REACTOR DIAGRID

[75] Inventors: Bernard Gallet, Bruyeres le Chatel; Robert Venot, Fontenay-aux-Roses, both of France

[73] Assignee: Commissariat a l'Energie Atomique, Paris, France

[22] Filed: June 9, 1975

[21] Appl. No.: 584,751

[30] Foreign Application Priority Data

June 12, 1974 France .............................. 74.20401

[52] U.S. Cl. .................................... 176/87; 176/40; 176/61; 176/64; 176/65; 248/68 R

[51] Int. Cl.[2] .......................................... G21C 21/08

[58] Field of Search .................. 176/40, 50, 61, 64, 176/65, 87; 248/49, 68 R

[56] References Cited

UNITED STATES PATENTS

| | | | |
|---|---|---|---|
| 3,401,081 | 9/1968 | Menzel et al. .................... | 176/61 X |
| 3,425,905 | 2/1969 | Greenhalgh et al. ............ | 176/87 X |
| 3,481,832 | 2/1969 | Rickert ............................ | 176/61 X |
| 3,873,419 | 3/1975 | Sletten ............................ | 176/40 X |
| 3,937,653 | 2/1976 | Leheu .............................. | 176/87 X |

*Primary Examiner*—Peter A. Nelson
*Attorney, Agent, or Firm*—Cameron, Kerkam, Sutton, Stowell & Stowell

[57] ABSTRACT

The upper portion of a hollow cylindrical spacer column is rigidly fixed to the reactor diagrid and supports a fuel assembly end-fitting by means of a removable sleeve having a conical bearing surface for sealing and centering the fuel assembly. The sleeve is engaged in interfitting relation with the column head and secured thereto by means of a removable annular weld connection.

2 Claims, 7 Drawing Figures

FUEL ASSEMBLY SUPPORT COLUMN FOR A NUCLEAR REACTOR DIAGRID

This invention relates to nuclear reactors, especially fast reactors, and is more particularly concerned with an improvement made in the constructional design of the diagrid for supporting the fuel assemblies which form the reactor core while ensuring that said assemblies are postioned with respect to each other and supplied with cooling fluid which consists in most instances of a liquid metal such as sodium.

It is known that a fast reactor core which is placed within an open vessel containing the liquid metal coolant is constituted by fuel assemblies placed side by side in a vertical position, each fuel assembly being made up of an open-ended outer casing or so-called wrapper which serves to direct the flow of coolant and contains a bundle of fuel pins of substantial length each constituted by a metal can enclosing fertile or fissile fuel material. These fuel wrappers usually have a polygonal and preferably hexagonal cross-section, the lower end of each fuel wrapper being joined to a cylindrical end-fitting and this latter being engaged in apertures which are suitably distributed in a support structure known as a diagrid. Said diagrid has at least two parallel horizontal sole-plates which are connected to each other by means of an outer cylindrical shell and are suitably braced by means of tubular cylindrical columns disposed so as to have a pitch corresponding to that of the fuel assemblies within the reactor core, the cylindrical end-fittings of said fuel assemblies being engaged in the top portions of said support columns. The liquid metal coolant penetrates under pressure through the diagrid within the cylindrical shell and is distributed through lateral slots formed in the columns. Said coolant is then discharged into the interior of the fuel assembly end-fittings through apertures which are also provided in the external surfaces of these latter. From said end-fittings, the coolant then flows upwards into the fuel wrappers in order to remove the heat generated by the fuel pins.

In conventional designs of this type, it can readily be understood that the cold liquid metal coolant at high pressure which pentrates into the diagrid must essentially be prevented from escaping from the top ends of the support columns outside the cylindrical end-fitting of the corresponding fuel assembly since leakages would be mixed in such a case with the hot liquid metal at low pressure which is present within the reactor vessel. Leakages of this type mainly result in insufficient cooling of fuel assemblies within the reactor core and in a limitation of thermal efficiency. It is therefore necessary to ensure suitable leak-tightness at the level of the bearing surface on which each fuel assembly is applied against each support column, said bearing surface being usually formed by a spherical surface which is provided in the fuel assembly wrapper at the level of the connection between the end-fitting and the wrapper and which is so arranged as to cooperate with a conical surface formed at the upper extremity of the support column.

The present invention relates to a particular structure which is adopted for the extremity of each support column, the object of the improvement which is contemplated being to dissociate the cylindrical body of the support column from its upper extremity or head which is provided with the bearing surface for the fuel assembly. The head of said support column is accordingly designed in the form of a separable component designated as a sleeve and is capable of performing its intended function of supporting and centering of the corresponding fuel assembly with the requisite degree of leak-tightness at the level of the bearing surface while permitting ready replacement of said sleeve in the event of damage or failure during operation of the reactor.

Patent protection has already been given to a design concept of this type, namely the so-called removable sleeve design disclosed in French Pat. No. 2,153,177 filed on Sept. 23, 1971. However, the practical application of this design entails the need to construct a supporting diagrid consisting of three superposed parallel grid plates or sole-plates. Thus the sleeve which penetrates into each support column is secured to the top sole-plate of the diagrid and screwed into the body of the support column with concomitant operation of an interlocking member consisting of resilient claws. In point of fact, this design solution can be attended by disadvantages in some cases, in particular when it is necessary to carry out the disassembly of the sleeve with respect to the support column. The reason for this lies in the difficulties involved in unscrewing of the sleeve when taking into account the usual diameter of this latter, namely of the order of 100 mm or more. In addition, the screwing system is not strictly leak-tight, although in the case of the design solution described in the patent cited earlier, leakages are collected between the two upper sole-plates.

Finally, consideration could be given to the possibility of forming the connection by insetting between the sleeve and the support column although in this case the joint is not strictly leak-tight. An alternative possibility could consist of a seal clamped in position by means of studs or the like. In the alternative form just mentioned, the expedient is satisfactory from the point of view of leak-tightness but the resultant construction carries a heavy cost penalty. Moreover, by reason of the large number of studs, the risk of slackening of some of the studs is not negligible.

The present invention relates to another form of construction of a support column comprising a removable sleeve which overcomes the disadvantages mentioned in the foregoing.

To this end, the support column under consideration comprises a hollow cylindrical body which is rigidly fixed to the diagrid and the upper portion of which passes through said diagrid so as to receive a fuel assembly end-fitting supported vertically by the diagrid, and a removable sleeve mounted in a head forming a coaxial extension of the hollow body, said sleeve being provided with a conical bearing surface for sealing and centering the fuel assembly. Said support column is distinguished by the fact that the removable sleeve and the head of the support column body are engaged in interfitting relation and secured to each other by means of a removable welded connection formed in an annular zone which is coaxial with the sleeve.

As an advantageous feature, the welded connection is formed at the extremity of two contacting lips which form part respectively of the sleeve and of the head of the hollow body. The weld is preferably formed without any filler metal.

In accordance with a number of alternative embodiments of the invention, the extremities of the contacting lips which are provided with the welded connection are formed either externally or internally with respect to the sleeve and the support column. The contacting lips extend in a horizontal plane at right angles to the common axis of the sleeve and of the support column or in a plane which is inclined to said axis at a predetermined angle in order to facilitate the formation of the welded connection or the destruction of this latter in the event of disassembly of the sleeve.

Further characteristic features of a column which serves to support a fuel assembly in a fast reactor and is designed in accordance with the invention will also be brought out by the following description of a number of exemplified embodiments which are given by way of indication without any limitation being implied, reference being made to the accompanying drawings in which.

In the different figures, components which are similar to each other are designated by identical reference numerals in each case.

Figure 1:
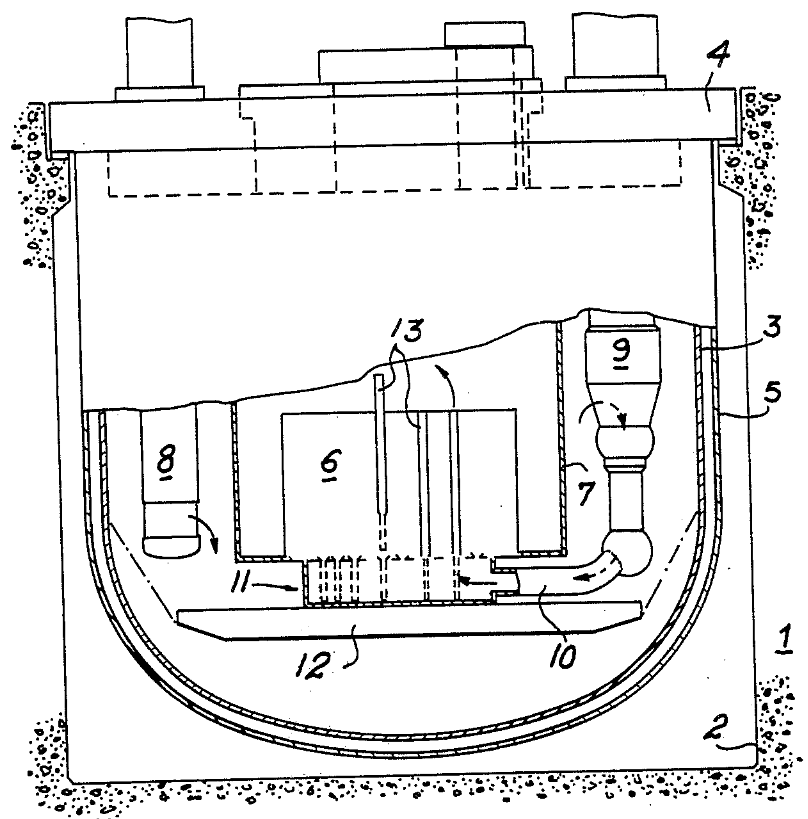
FIG. 1 is a very diagrammatic partial vertical sectional view of a fast reactor which illustrates the diagrid employed for supporting the core of a reactor of this type and the positioning of the reactor fuel assemblies with respect to said diagrid.

FIG. 1 is a very schematic view of a fast reactor taken in transverse cross-section. There is shown in this figure an outer enclosure or concrete containment structure 1 of a reactor of this type. Said containment structure defines a vault 2 in which is mounted a metallic tank having a spherical bottom portion or primary vessel 3 which contains a suitable volume of liquid metal for cooling the reactor core and usually consists of sodium. The upper extremity of said primary vessel 3 is suspended from a horizontal shield slab or vault roof 4 of substantial thickness which closes the vault 2 and rests on support corbels of the concrete containment structure 1. The primary vessel 3 is also surrounded externally by a second tank or so-called lead-jacket 5 which ensures protection against sodium leakage in the event of failure of the primary vessel 3.

The reactor core 6 is placed within the interior of the assembly formed by the primary vessel 3 and leak-jacket 5, said reactor core being immersed in the volume of liquid metal contained within the primary vessel. The separation between the hot sodium which passes out of the reactor core and the cold sodium which passes into this latter is ensured by means of an intermediate tank or so-called internal vessel 7. The removal of heat transferred to the sodium as this latter passes through the reactor core takes place within heat exchangers 8 before being returned beneath the reactor core by circulating pumps 9 for a further passage within said core. To this end and in accordance with a conventional arrangement, the outlet of the pumps 9 is connected to ducts 10 through which the cooled sodium is discharged into a support diagrid 11 on which the reactor core 6 rests, said diagrid 11 being in turn carried by a support floor 12 which is rigidly fixed to the internal wall of the primary vessel 3. In accordance with conventional practice, the reactor core 6 is formed by a juxtaposed array of fuel assemblies such as the assembly 13 which are maintained in a vertical position within the reactor core and in adjacent relation by engagement of their lower ends in the diagrid 11.

Figure 2:
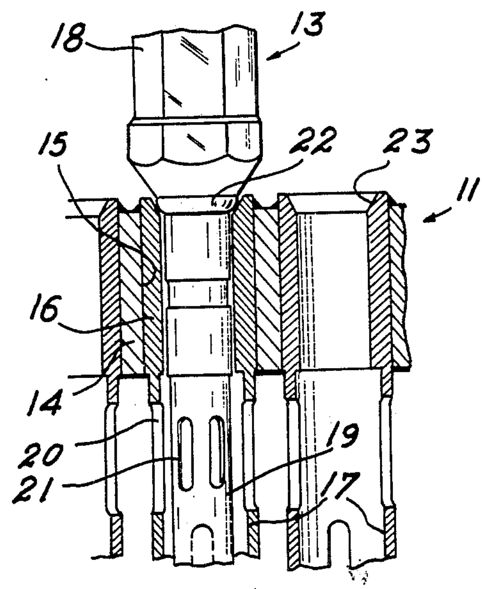
FIG. 2 is a detail view to a larger scale illustrating the upper portion of a support column head of known type.

As can be seen more especially in FIG. 2, the diagrid 11 comprises a plate or top horizontal sole-plate 14 in which a certain number of passageways or apertures 15 are formed. There are engaged through said apertures the heads or upper extremities 16 of spacer columns 17 which ensure suitable spacing between the top plate 14 of the diagrid and a parallel plate (not shown in the drawings) which is located at the bottom portion of said diagrid. In accordance with conventional practice, each fuel assembly 13 is constituted by an open metallic casing or fuel wrapper 18 which is usually of hexagonal shape and the lower end of which is provided with an extension in the form of a hollow cylindrical end-fitting 19. Said end-fitting is capable of engaging within each support column 17 of the diagrid 11 so as to ensure that the reactor core assemblies are suitably maintained in vertical and parallel relation, the distribution of the support columns 17 in the diagrid being such as to correspond to the pitch of the fuel assembly lattice in the reactor core. The circulation of the liquid sodium which is introduced into the diagrid 11 from circulating pumps 9 takes place through lateral slots 20 formed in the external wall of each support column 17. After passing through elongated slots 21 formed in the end-fitting 19, said sodium then flows upwards within each fuel assembly end-fitting and subsequently into the interior of each fuel wrapper 18 in contact with canned fuel pins (not shown) which enclose the fuel material.

In order to prevent outleakage of sodium from the diagrid 11 and in particular in order to ensure that the entire flow of sodium circulates within the interior of the fuel assemblies which are carried by said diagrid, it is possible to adopt the known arrangement which is illustrated in FIG. 2. Thus, a spherical bearing surface 22 provided within each fuel wrapper 13 in the vicinity of its connection with the cylindrical end-fitting 19 can ensure leak-tightness between each fuel assembly and the diagrid at the level of the upper portion of the heads 16 of the support columns 17. Said bearing surface 22 is intended to rest on a conical bearing face 23 which is machined in the corresponding head 16 prior to assembly. In this conventional solution, each column head 16 forms an integral portion of the body of the support column 17. In consequence, it is not possible to carry out unitary disassembly of each of said heads. Any damage sustained by one column head especially at the level of its bearing surface 23 thus entails the need for repairs in situ on the diagrid or for complete replacement of this latter.

The present invention relates to an improvement made in the known arrangements shown in FIG. 2 by making provision in particular for a removable column head.

Figure 3:
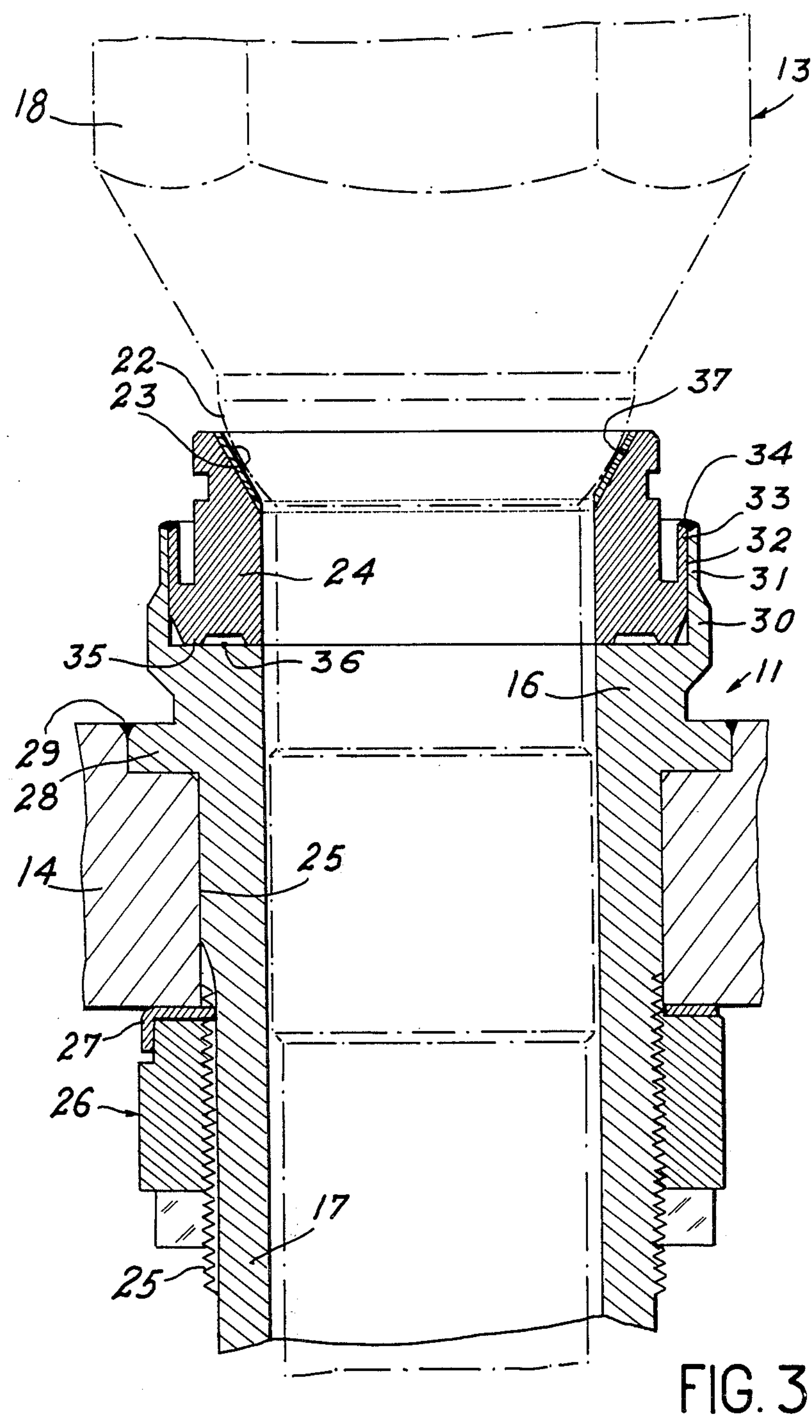
FIG. 3 is a sectional view to a larger scale showing a support column head in accordance with the invention.

To this end and as shown in FIG. 3, the head 16 of each support column 17 is associated with a removable sleeve 24, the top portion of which fits in said head and which supports the fuel assembly 13. As in known designs, each support column 17 passes through an aperture 15 provided in the top plate 14 of the diagrid 11 and is locked in position with respect to said plate by means of a screw-thread 25 formed in the external surface of said column, said threaded portion being capable of cooperating with a nut 26 which is locked in position by a locking component 27 when tightened hard up. Provision is made in the head 16 of the support column 17 at the level of the external surface of the diagrid plate 14 for a bearing shoulder 28 which is mounted within a groove of the plate 14 and locked in position by means of a weld fillet 29. In the example of construction shown, that portion of the head 16 which projects to a slight extent from the plate 14 comprises a flange 30 fitted with a vertical circular lip 31, an internal recess 32 being formed within said lip and the removable sleeve 24 being fitted within said recess. Said sleeve also has an external cylindrical lip 33 which is applied in close contact with the lip 31, the connection between these two lips being formed by means of a weld fillet 34 at the end of the assembly formed by the sleeve 24 and the head 16 of the support column 17. The sleeve 24 is applied by means of circular projecting portions 35 against a flat bearing face 36 formed in the head 16 and is finally provided with a stellited bearing facing 37 along the conical bearing face 23 which supports the spherical bearing surface 22 of the fuel assembly 13.

Figure 4:
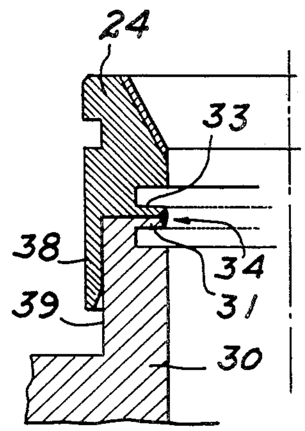
FIGS. 4 to 7 are detail views in partial cross-section showing other forms of construction.
Figure 5:
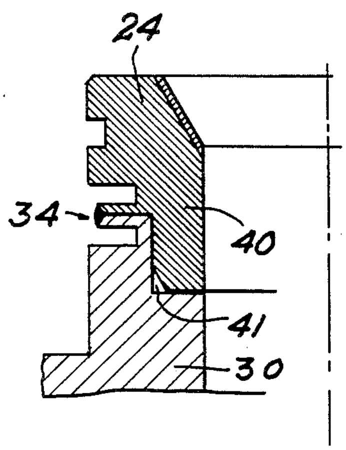
Figure 6:
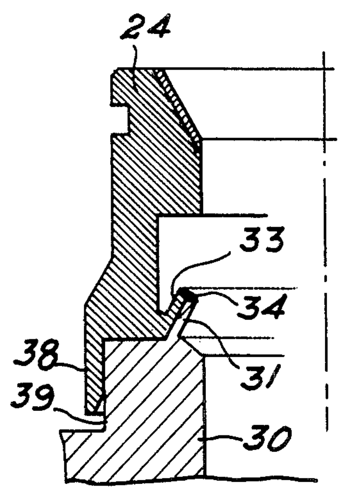

In other alternative forms of construction which are illustrated in FIGS. 4 to 6, the lips 31 and 33 which are formed respectively on the head 16 of the support column 17 and on the removable sleeve 24 are arranged in a manner which is slightly different from that described above with reference to FIG. 3. As shown in particular in FIG. 4, the two lips 31 and 33 aforesaid extend horizontally and towards the interior of the assembly formed by the sleeve and the column head. Suitable preliminary engagement of the sleeve over said head is achieved by means of a circular collar 38 which is formed on the sleeve 24 and fits over the external surface 39 of the head 16. In the alternative embodiment shown in FIG. 5, the lips 31 and 33 are directed towards the exterior of the assembly formed by the removable sleeve and the column head, fitting of said sleeve over said head being obtained in this example by means of an internal collar 40 engaged within a recess 41 which is provided within the head 16 of the support column 17.

Figure 7:
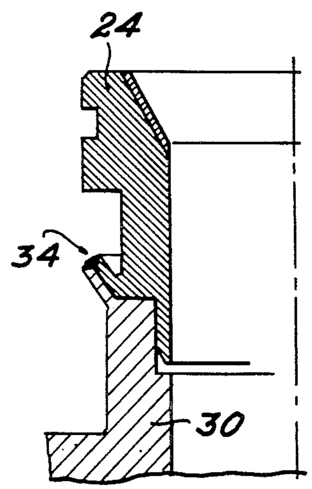

Finally, arrangements which are substantially similar to those illustrated in FIGS. 4 and 5 are again shown in the alternative embodiments of FIGS. 6 and 7. In this case, however, the plane of contact of the lips 31 and 33 is no longer horizontal, that is to say at right angles to the common axis of the sleeve and of the column head, but is upwardly inclined substantially at an angle of 45° to said axis in order to facilitate the formation of the weld fillet 34 or the destruction of this latter in the case in which it is desired to separate the sleeve from the head.

The constructional arrangements thus contemplated offer the advantage of permitting unitary replacement of any particular sleeve among all those associated with the columns of the diagrid which supports the fuel assemblies in the event of damage sustained by said sleeve, especially at the level of the bearing surface on which the corresponding fuel assembly is supported. Such damage may be the result of an accident condition which is liable to arise during operation of the reactor and may be caused by dropping of a fuel assembly, for example. Operations involved in replacement of a sleeve are particularly straightforward since it is only necessary to make use of a remote-cutting apparatus of conventional design in order to destroy the weld fillet formed between the two lips which joint the sleeve to the head of the support column body, to remove the damaged sleeve by means of a suitable handling device, then to fit a new sleeve in position, whereupon a new welded joint is formed by means of a remotely-operated welding torch or other suitable welding appliance. It should be noted that, in all cases, the arrangement of the two connecting lips is such that the weld fillet to be formed can be located at one point with an extremely high degree of accuracy and that any conventional remote-controlled welding appliance can be employed without any major problem.

The arrangements of the present invention offer further advantages from the point of view of operational safety, especially insofar as the number of parts to be machined is limited to a strict minimum. The different parts employed do not have any delicate components which are liable to be broken or to fall within the reactor and therefore do not introduce any danger in comparison with the conventional design concept. Finally, by making use of a removable sleeve, it is possible to avoid the need to place the heads of support columns at an excessive height with respect to the top soleplate of the diagrid.

It will be readily apparent that the invention is not limited solely to the constructional examples which have been described in the foregoing and illustrated in the accompanying drawings but extends on the contrary to all alternative forms.

What we claim is:

1. In a nuclear reactor including a fuel assembly support column, a nuclear reactor diagrid mounted on said column, a hollow cylindrical body rigidly fixed to said diagrid, an upper portion of said body passing through said diagrid and receiving a fuel assembly end-fitting supported vertically by said diagrid, a head for said body, a removable sleeve mounted in said head forming a coaxial extension of said hollow body, a conical bearing surface in said sleeve for sealing and centering the fuel assembly, said removable sleeve and said head of said support column body being engaged in interfitting relation, an annular lip for said sleeve, an annular lip for said head, said lips being in engagement and a removable welded connection sealing said sleeve to said head in an annular zone coaxial with said sleeve at extremities of said lips.

2. A reactor according to claim 1, wherein said welded connection is without filler metal.

* * * * *